United States Patent
Rarick

(10) Patent No.: US 11,579,844 B2
(45) Date of Patent: Feb. 14, 2023

(54) SMALL MULTIPLIER AFTER INITIAL APPROXIMATION FOR OPERATIONS WITH INCREASING PRECISION

(71) Applicant: Imagination Technologies Limited, Kings Langley (GB)

(72) Inventor: Leonard Rarick, San Diego, CA (US)

(73) Assignee: Imagination Technologies Limited, Kings Langley (GB)

( * ) Notice: Subject to any disclaimer, the term of this patent is extended or adjusted under 35 U.S.C. 154(b) by 144 days.

(21) Appl. No.: 17/209,809

(22) Filed: Mar. 23, 2021

(65) Prior Publication Data
US 2021/0208850 A1 Jul. 8, 2021

Related U.S. Application Data

(62) Division of application No. 14/516,643, filed on Oct. 17, 2014, now Pat. No. 10,983,756.

(51) Int. Cl.
| | |
|---|---|
| *G06F 7/552* | (2006.01) |
| *G06F 7/523* | (2006.01) |
| *G06F 7/537* | (2006.01) |

(52) U.S. Cl.
CPC ............. *G06F 7/552* (2013.01); *G06F 7/523* (2013.01); *G06F 7/537* (2013.01); *G06F 7/5525* (2013.01); *G06F 2207/5351* (2013.01)

(58) Field of Classification Search
CPC ........... G06F 7/483; G06F 7/487–4876; G06F 7/552; G06F 7/5525; G06F 7/533–5375; G06F 7/544; G06F 2207/535–5356
USPC ....... 708/495, 500, 502–514, 620, 635, 650, 708/653–654
See application file for complete search history.

(56) References Cited

U.S. PATENT DOCUMENTS

| | | |
|---|---|---|
| 5,220,524 A | 6/1993 | Hesson |
| 8,990,278 B1 | 3/2015 | Clegg |
| 9,904,512 B1 | 2/2018 | Pasca |

(Continued)

OTHER PUBLICATIONS

Gallagher et al., "Error-Correcting Goldschmidt Dividers Using Time Shared TMR," 1998 IEEE Int'l Symposium on Defect and Fault Tolerance in VLSI Systems, pp. 226-229, 1998.

(Continued)

*Primary Examiner* — Emily E Larocque
(74) *Attorney, Agent, or Firm* — Potomac Law Group, PLLC; Vincent M DeLuca

(57) ABSTRACT

In an aspect, a processor includes circuitry for iterative refinement approaches, e.g., Newton-Raphson, to evaluating functions, such as square root, reciprocal, and for division. The circuitry includes circuitry for producing an initial approximation; which can include a LookUp Table (LUT). LUT may produce an output that (with implementation-dependent processing) forms an initial approximation of a value, with a number of bits of precision. A limited-precision multiplier multiplies that initial approximation with another value; an output of the limited precision multiplier goes to a full precision multiplier circuit that performs remaining multiplications required for iteration(s) in the particular refinement process being implemented. For example, in division, the output being calculated is for a reciprocal of the divisor. The full-precision multiplier circuit requires a first number of clock cycles to complete, and both the small multiplier and the initial approximation circuitry complete within the first number of clock cycles.

6 Claims, 7 Drawing Sheets

(56) References Cited

U.S. PATENT DOCUMENTS

2003/0149712 A1    8/2003    Rogenmoser et al.
2004/0024806 A1    2/2004    Jeong et al.

OTHER PUBLICATIONS

Gallagher et al., "Fault Tolerant Newton-Raphson Dividers Using Time Shared TMR," 1998 IEEE Int'l Symposium on Defect and Fault Tolerance in VLSI Systems, pp. 241-243, 1998.

Ito et al., "Efficient Initial Approximation for Multiplicative Division and Square Root by a Multiplication with Operand Modification," IEEE Transactions on Computers, vol. 46, No. 4, pp. 405-498, 1997.

Wang et al., "A Decimal Floating-Point Divider Using Newton-Raphson Iteration," The Journal of VLSI Signal Processing, vol. 49, pp. 3-8.

(*NOTE: NPL documents in parent application).

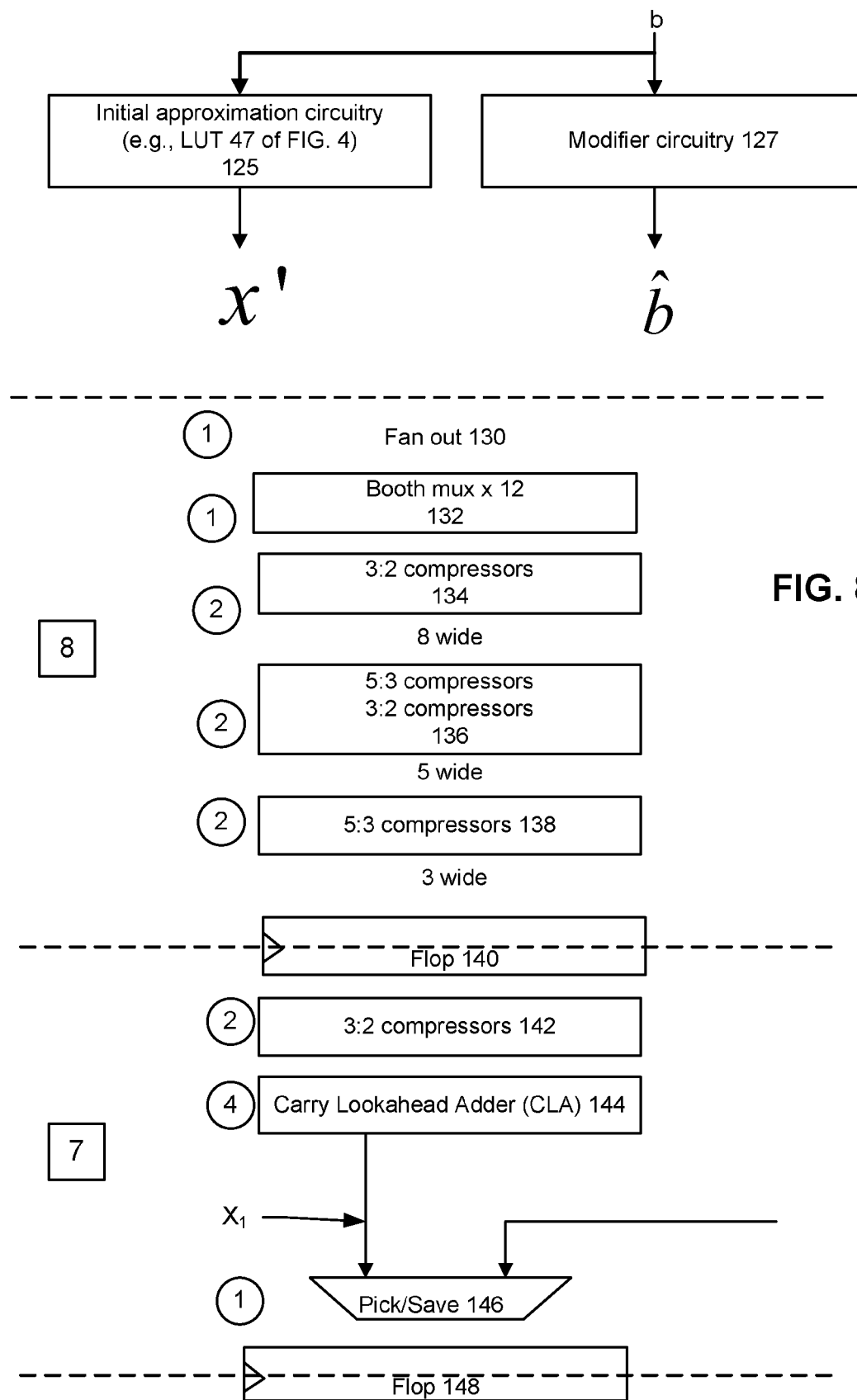

SMALL MULTIPLIER AFTER INITIAL APPROXIMATION FOR OPERATIONS WITH INCREASING PRECISION

BACKGROUND

Field

In one aspect, the following relates to microprocessor microarchitecture, and in an example particular aspect, to implementations of divide and square root functions in hardware.

Related Art

An important aspect of computation is the ability to perform arithmetic. Processors, such as generally programmable processors, digital signal processors, graphics processors, generally have a capability to perform arithmetic, such as one or more of integer, fixed, and floating point arithmetic. The performance of such arithmetic can be controlled by arithmetic instructions, which can vary among different architectures, but for the sake of example, can include addition, subtraction, multiplication, division, and square root instructions. A particular implementation of such instructions may involve decomposing such operations into operations that are supported on a particular hardware implementation. For example, a particular implementation may not have separate circuitry implementing a floating point multiplier (or more generally, a floating point math unit), and as such, a floating point multiply instruction may be implemented by emulating the instruction in microcode on the processor, within the operating system, or in compiled user-space code. Such emulation is always much slower than a dedicated hardware floating point unit. However, a hardware floating point unit consumes area on a semiconductor substrate, and hence increases cost.

Some hardware arithmetic units implement divide and square root operations by using an iterative refinement from an initial approximation, such as an implementation of Newton-Raphson. For example, dividing term a by term b (i.e., a/b) can be performed by finding the reciprocal of term b (1/b) using Newton-Raphson, and then multiplying that reciprocal by term a. Implementations of Newton-Raphson often involve using a LookUp Table (LUT) indexed by a portion of term b to produce an initial approximation of the reciprocal of b, which is then refined through an appropriate number of iterations of the Newton-Raphson procedure.

For example, FIG. 1 depicts an operand 15, from which some portion of index bits 20 (some number of the most significant bits of the mantissa of operand 15) are used to index a LUT 25. In response to index bits 20, k bits of output 28 are produced. An implementation of LUT 25 may use around 9 bits of the mantissa of operand 15, and the LUT 25 in such case would generally provide k=7 or k=8 output bits. In other words, the initial approximation of the reciprocal includes about 7 to 8 bits of precision. The final result of the calculation, however, generally is expected to be accurate to 24 bits of precision for single-precision floating point and 53 bits for double-precision floating point. The k bits of output 28 are expanded in an expander 32 to a full size of a full-precision multiplier circuit 35 by padding zeroes to a least significant bit side. Then, that input can be multiplied with another selected input. In the context of Newton Raphson, for the first iteration, that input is the divisor (Term b). A complement of the output of that multiplication is then multiplied with the expanded initial approximation to produce a revised approximation for a subsequent iteration. A number of bits of precision approximately doubles with each iteration. However, the output size of the multiplier is the same, regardless of a number of bits of precision actually available in each iteration.

FIG. 2 depicts a method of using the circuit of FIG. 1 that is general to any algorithm that uses a table lookup for an initial low-precision estimate of a value used in a multiplication. At 80, an operand is received, and at 81, a portion of the operand (e.g., a part of a mantissa) is used to index a LUT. At 82, the LUT outputs k bits of initial approximation. At 83, those bits are padded to a size of input to a multiplier that supports full-precision inputs. At 84, the expanded initial approximation is provided to the multiplier, and at 85 another full-size term is provided to the multiplier. At 86, the multiplier performs a full-precision multiplication on the provided terms. A number of bits of precision resulting from the multiplication depends on the size of k and the number of bits of precision in the other term. A typical value of k is 7 bits.

Most high-speed designs for multipliers use multiple clocks to fully perform the multiplication of two mantissas. FIG. 3 depicts that a multiplier requires 3 clocks to produce a result that can be fed back for further iteration in a Newton-Raphson algorithm. The Carry Save Adder (CSA) requires 2 clocks and the Carry Lookahead Adder (CLA) requires 1 clock. In such a case, if the initial approximation requires one clock to produce, then a 2-clock delay is required to synchronize the start of the first multiplication for the Newton Raphson method with subsequent multiplications.

The circuitry to implement a multiplier is a large structure and a carry save adder (CSA) dominates an overall area of a multiplier. Therefore, it has been conventional to implement one multiplier and use that multiplier for as many different operations as possible.

SUMMARY

Because of the table lookup involved in operations that use an initial approximation (e.g., divide and square root), which typically takes at least one clock, a scheduling problem arises when using a single multiplier unit for regular multiplications and for operations using iterative refinement, such as divide and square root operations.

One aspect relates to an apparatus, such as a processor, for arithmetic calculation. The apparatus includes a source for an initiation approximation of one term (such as a reciprocal). Such source can include a LUT, for example. The LUT produces an output with k bits of precision, where k is less than a number of bits of precision in a final result. The apparatus includes a full-precision, large multiplier and a reduced-precision, small multiplier. The reduced precision small multiplier receives the k bits outputted from the LUT as a first term and multiplies that term with a sufficient number of bits from a second term to result in p bits of precision in an output result, where p>k. The small multiplier has less latency than the large multiplier, and collectively, a sum of the latency to produce the initial approximation and the latency of the small multiplier is no greater than the latency of the large multiplier (in terms of clock units). Such apparatus also includes logic to control usage of the small multiplier and the large multiplier to perform iterative refinement. In one implementation, the small multiplier described above is used for the first multiplication of the first iteration of a reciprocal calculation. Thereafter, the large, full-precision multiplier is used. Thus, such an apparatus includes both a full-precision multiplier and a separate reduced-precision multiplier.

A further aspect includes that an apparatus may provide a hierarchy of hardware elements that each perform the same operation but maintain different numbers of bits of precision in their respective outputs. The hierarchy of hardware elements is configured so that outputs of lower-precision elements provide inputs to higher precision elements. Elements within the hierarchy, or some portion thereof, also may selectively recycle an output either to itself, or to the input of another element. In order to calculate a final output value for a sequence of operations, progressively greater precision outputs are achieved by starting from low-precision inputs to the lowest precision hardware element, and allowing outputs of increasingly higher precision to propagate through the hierarchy, where propagation also includes multiple iterations through some subset of the hardware elements. In a particular implementation, the hierarchy has two levels, a lower-precision and a full-precision level. Embodiments according to the disclosure include a processor that includes an instruction set that includes divide and square root instructions, wherein the divide and square root instructions are performed using implementations according to the disclosure. Some processor implementations may have other instructions that are performed using techniques disclosed herein. Other implementations may be provided, for example, in semi-programmable, or fixed-function logic.

BRIEF DESCRIPTION OF THE DRAWING

FIG. 8 depicts an example construction of a small multiplier according to the disclosure;

DETAILED DESCRIPTION

As introduced above, aspects of the disclosure include arithmetic units that have a large, full-precision multiplier and also a small, limited precision multiplier. Such arithmetic units include control logic that causes a first multiplication, which involves low precision inputs to be conducted within the limited precision multiplier, and a result of that multiplication then used as though it were an output of the full precision multiplier. Because the small multiplier is faster than the full-precision multiplier, a total number of clocks to obtain both the initial approximation and perform the first multiplication can be the same as a number of clocks required for a full-precision multiplication in the full-precision multiplier. The general convention of describing timing for pipelines in terms of "clocks" or "clock cycles" is followed here. However, it would be understood that this disclosure uses these terms to describe relative delays for different circuitry in an example implementation, rather than an absolute sense applying across all implementations. Also, in general, a given portion of combinatorial logic, or a result of some processing may be ready before an expiration of a given clock cycle for traversing that logic, or producing that result, even though the result may be sampled later.

Aspects of the disclosure are presented using an example Newton Raphson implementation. However, the identified aspects will find application in other contexts.

Figure 1:
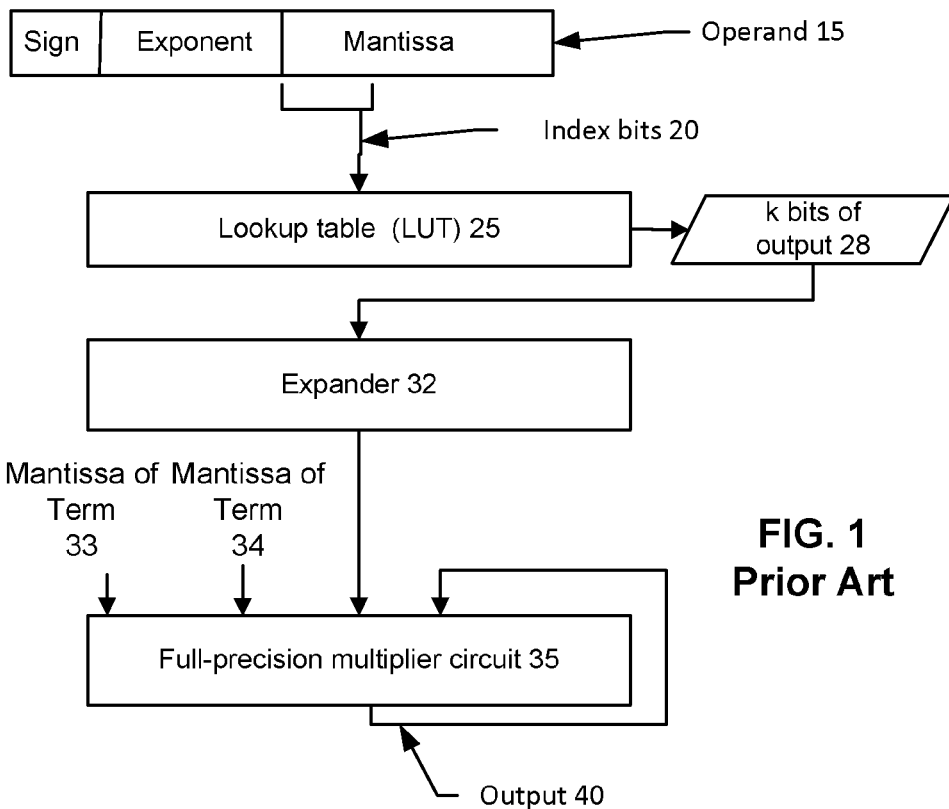
FIG. 1 depicts a block diagram of some aspects of a prior art divide/square root part of a hardware arithmetic unit.
Figure 2:
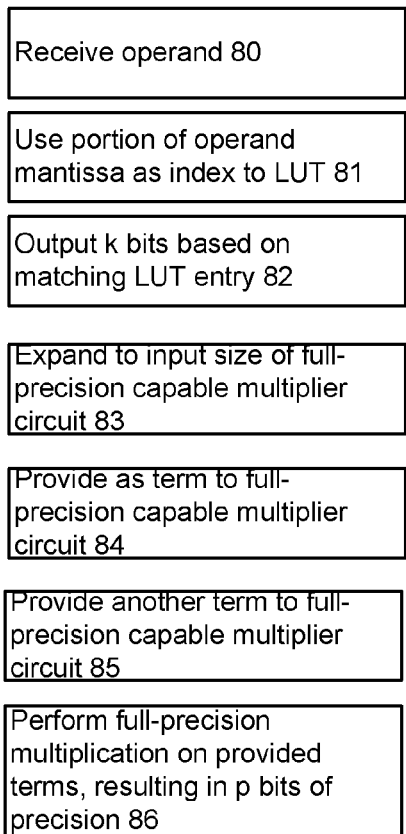
FIG. 2 depicts a prior art method of using the circuitry depicted in FIG. 1.
Figure 3:
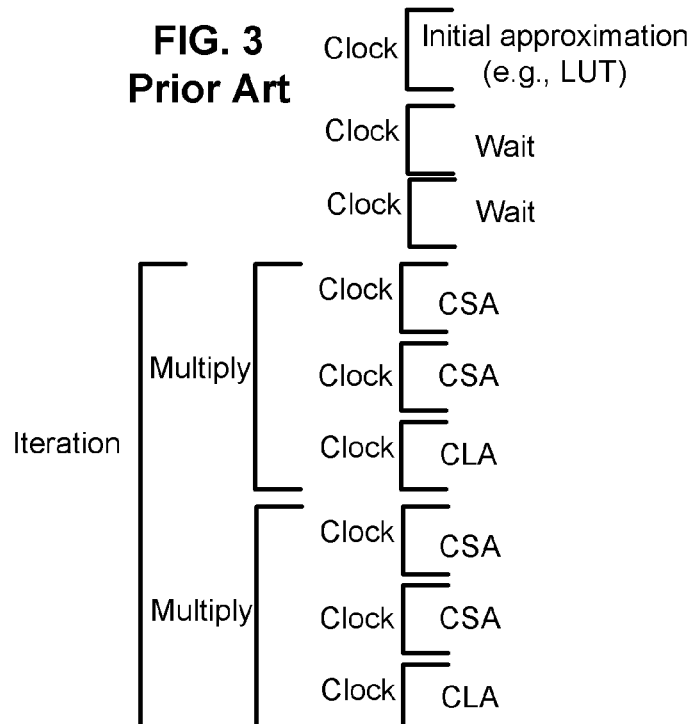
FIG. 3 depicts wait states inserting to synchronize a start of a first multiply where a first clock was used for a table lookup.
Figure 4:
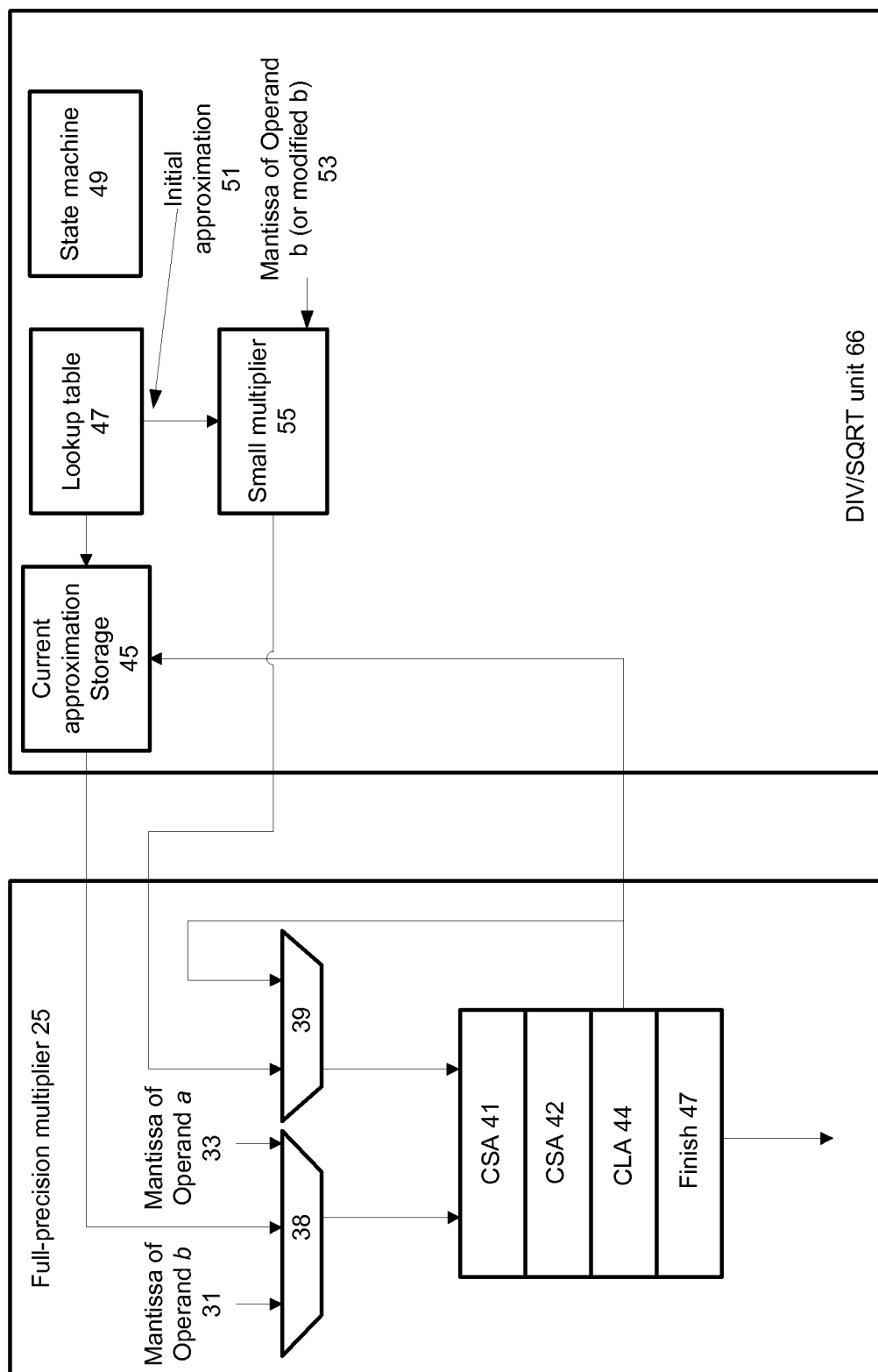
FIG. 4 depicts an example apparatus in which a small multiplier is used to perform an initial low-precision multiplication.

FIG. 4 depicts a full-precision multiplier 25 that includes a multiplexer 38 that can select from a mantissa of operand a 33, from a mantissa of operand b 31 and from another input described below. Multiplier 25 also includes a multiplexer 39 that can selectively output either a result of small multiplier 55 or from a stage of full-precision multiplier 25, itself. For example, multiplier 25 includes a multi-stage pipeline, that, for example, includes two stages 41, 42 allocated to a Carry Save Adder (CSA) and a stage 44 allocated to a Carry Lookahead Adder (CLA). Finish stage 47 represents a variety of operations that may be performed on an output from CLA stage 44, such as rounding and normalization. Apparatus 50 also includes a divide/square root unit 66. Divide/square root unit 66 can be implemented by circuitry configured to perform operations and coupled as described below.

While mux 38 and mux 39 were depicted as being part of multiplier 25, these multiplexers and select logic can be formed from circuitry that may not be physically co-located with circuitry implementing portions of multiplier 25, even though in general, they may be.

A LookUp Table (LUT) 47 is coupled to receive a portion of bits (typically, a portion of the Most Significant Bits (MSBs)) of a value for which a reciprocal is to be calculated through iteration. LUT 47 outputs an initial approximation 51 that has a known number of bits, k, of accuracy. Initial approximation 51 is input to a small multiplier 55. Initial approximation 51 is to be multiplied with an input 53 that is either operand b, in one implementation, or a modified operand b in another implementation. Modified operand b is explained below.

The output of small multiplier 55 provides output that is an input to multiplexer 39. A current approximation storage 45 is coupled to receive an output from CLA 44 and is coupled to an input of multiplexer 38. Multiplexer 39 can have a separate input from small multiplier 55 and from CLA 44; control logic generating a select signal for mux 39 can control output from mux 39 accordingly. A state machine 49 tracks state associated with iterative refinement operations. These elements are characterized as being included in divide/square root unit 66, since these elements are used in performing divide and square root calculations in the present example. However, physical realizations of these elements can be intermingled with other circuitry and the block diagram of FIG. 4 does not imply that a distinctive unit for divide and square root calculations or other calculations using iterative refinement must be supplied or be identifiable in an implementation.

Figure 5A:
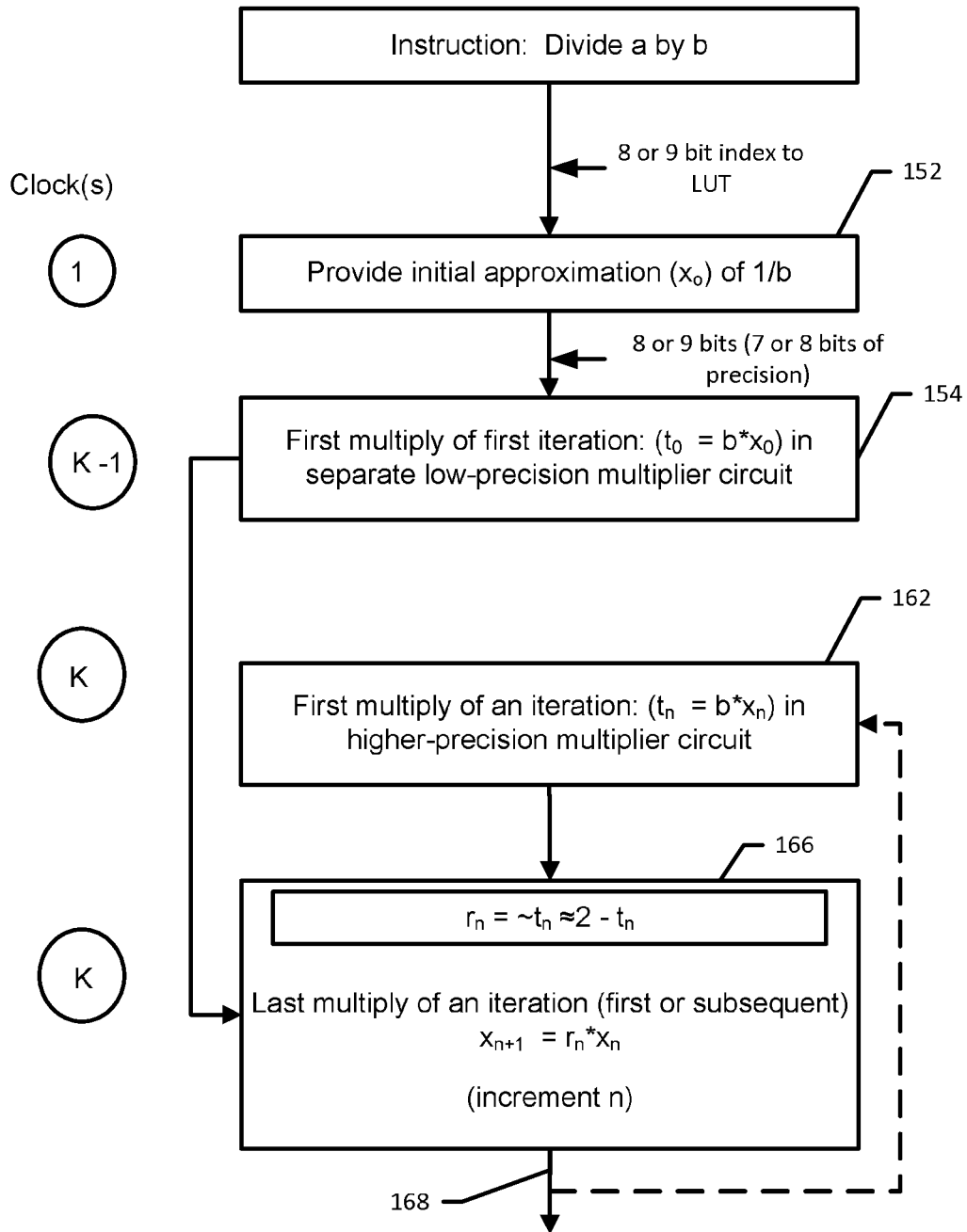
FIGS. 5A and 5B depict example implementations of a pipelined flow within an apparatus according to the example of FIG. 4.

FIG. 5A depicts a pipeline that performs Newton Raphson to produce a reciprocal of a value b, which is an operation that can be performed in order to execute an instruction requesting a division of dividend a by b (i.e., a/b). A portion of b (for example, either 8 or 9 bits Most Significant Bits) is supplied as an index to a LUT. The LUT provides (152) an initial approximation ($x_o$) of 1/b, which is 8 or 9 bits, and has 7 or 8 bits of precision. This action requires one unit of time. Herein, a unit of time is called a "clock" for simplicity, but a unit of time is a relative measure with respect to time required to take other actions in the pipeline, not an absolute measure.

During the first iteration, n=0. In order to perform a first multiplication (154) of a first iteration, $x_o$ is supplied to a low-precision (small) multiplier circuit (e.g., small multiplier 55 of FIG. 4) which multiplies $x_o$ by b ($t_0$=b*$x_0$). A next (and last) multiplication for the first iteration is performed (166) in a higher precision multiplier (such as full precision multiplier 25). This multiplication is $x_1$=$x_0$*$r_0$ where $r_0$=~$t_0$≈2−$t_0$. ~$t_0$ is the complement of to and is an approximation of 2−$t_n$. This complement can be produced faster than actually performing that subtraction, and hence is used in this example implementation.

Lookup 152 and multiplication 154 collectively require K clocks (in one example, K=3), with no more time than used by multiplication 162. A result 168 of multiplication 166 yields a better approximation, $X_{n+1}$, which is fed back to the first multiplication 162 of an iteration. For example, $x_1$ is produced by multiplication 166 at the end of the first iteration, so that $x_1$ is used to produce $t_1$=b*$x_1$ in the second iteration. Each subsequent multiply 162 or multiply 166 and complement requires K clocks, respectively.

After an appropriate number of iterations, result 168 of multiplication 166 is used as a sufficiently-accurate approximation of the reciprocal of b (1/b). The reciprocal of b is then used in a multiplication with a to complete the division. For single precision floating point, 24 bits of precision are required; for double precision floating point, 53 bits of precision are required; for single-width integer, 32 bits of precision are required; and for double-width integer, 64 bits are required. In this example, 7 or 8 bits of precision are provided (152) by the initial approximation, and each iteration doubles that precision. So, with 7 bits of precision and single precision floating point, multiplication 154 will be performed once, multiplication 162 will be performed twice, and multiplication 166 will be performed 3 times. While these examples do not describe extended float formats, the disclosures herein could be adapted to an implementation supporting extended floating point formats. Such adaptation could include one or more of providing more precision in an initial approximation, and performing an additional iteration.

With respect to the example of FIG. 4, CLA 44 is a last stage of multiply 166, and output from CLA 44 can be sent to current approximation storage 45, if present, or directly to multiplexer 39, or both, in some implementations. Current approximation storage 45 can be updated with each updated approximation, $x_{n+1}$. Some implementations may not require or use storage for a current approximation. On a final iteration, CLA 44 would provide output to the finish stage 47, instead of to multiply 162.

The arrangement of LUT 47, small multiplier 55, and full-precision multiplier 25 is designed to produce a result accurate to within required precision within a pre-determined number of iterations. State machine 49 can count a number of iterations that have been performed in order to determine when sufficient precision has been achieved in the output and then can cause a current value from CLA 44 to be provided to finishing stage 47.

Operation of finishing stages to produce a final result of the multiplication and also to produce the result of the multiplication between 1/b and a are not depicted, as these aspects are not central to the disclosure.

Figure 5B:
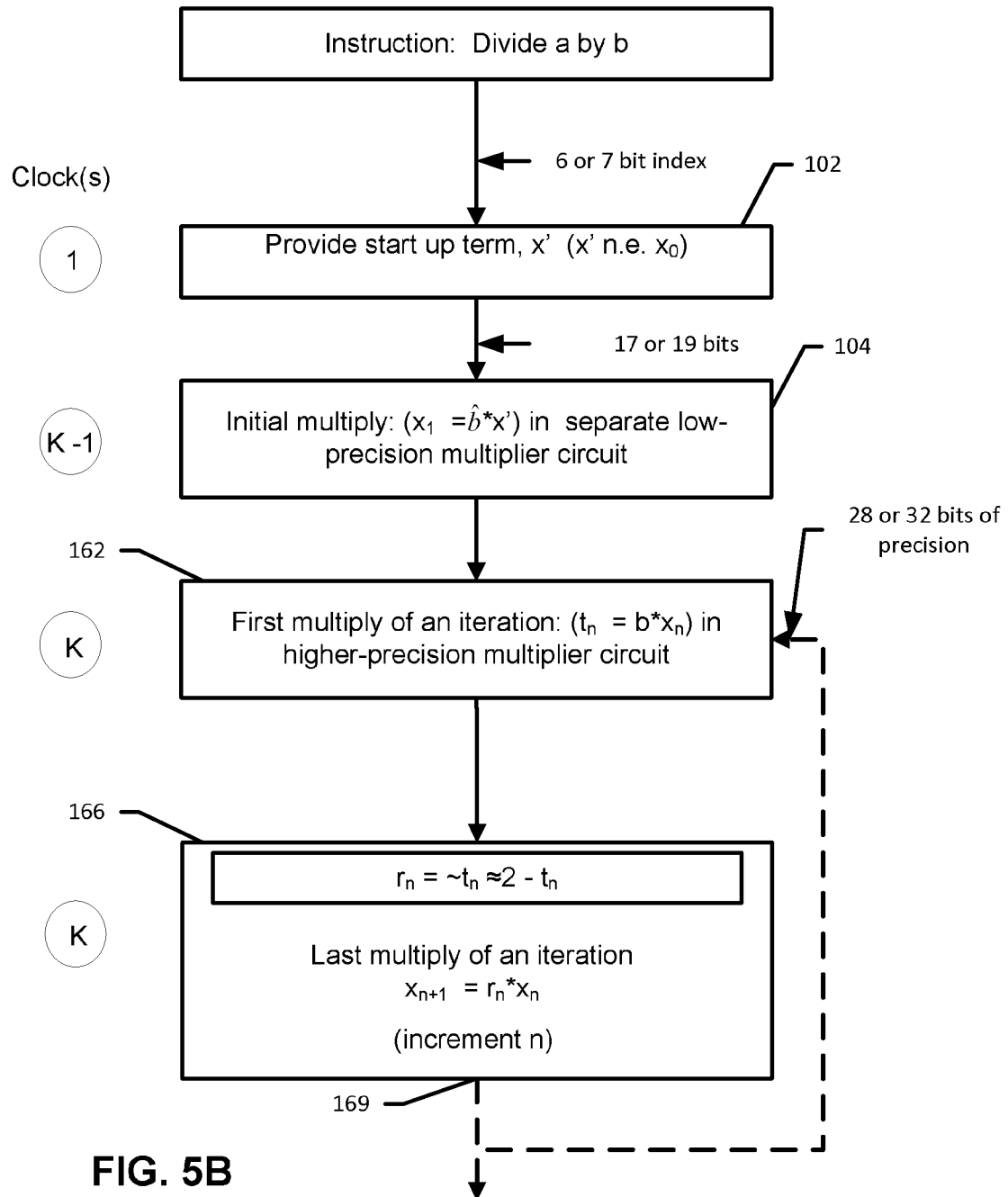

FIG. 5B depicts an alternate implementation in which an $x_1$ with 14 or 16 bits of precision is available after only one multiplication, such that only one refinement step is required to produce a single-precision value and two refinement steps are required to produce a double-precision value. This implementation generally is in accordance with an approach described in Masayuki ITO, et al., "Efficient Initial Approximation for Multiplicative Division and Square Root by a Multiplication with Operand Modification" *IEEE Transactions on Computers*, Vol. 46, No. 4, April 1997 ("Ito" herein), with described modifications.

FIG. 5B depicts that 6 or 7 MSBs of b can be used as a LUT index to provide (102) a startup term, x', x' ≠$x_0$. A first multiplication (104) produces $x_1$=b̂*x'. $x_1$ has 14 or 16 bits of precision. The multiplications 162 and 166 of FIG. 5A are the same in FIG. 5B, except that multiplication 162 is first performed, as $t_1$=b*$x_1$, not $t_0$=b*$x_0$ as in FIG. 5A, and these changes propagate through to multiplication 166, and as necessary, to a subsequent iteration. Note that, in both FIGS. 5A and 5B, $x_2$ is sufficient for single precision, while $x_3$ is sufficient for double precision. A principal difference is that multiplication 162 and 166 are performed only once for single precision, and twice each for double precision.

The examples of FIGS. 5A and 5B were in the context of a division. Another example application of the disclosure is for square root. Square root can be implemented in accordance with either FIG. 5A or FIG. 5B. The value being produced through iterative refinement, for square root, is 1/√b. The first multiplication involving the initial approximation thereof is conducted in small multiplier 55, with subsequent multiplications performed in full precision multiplier 25. For square root, step 166 is changed to compute $x_{n+1}$≈$x_n$(3−($x_n t_n$))/2 and this requires two executions of the full precision multiplier of K clocks each.

Figure 6:
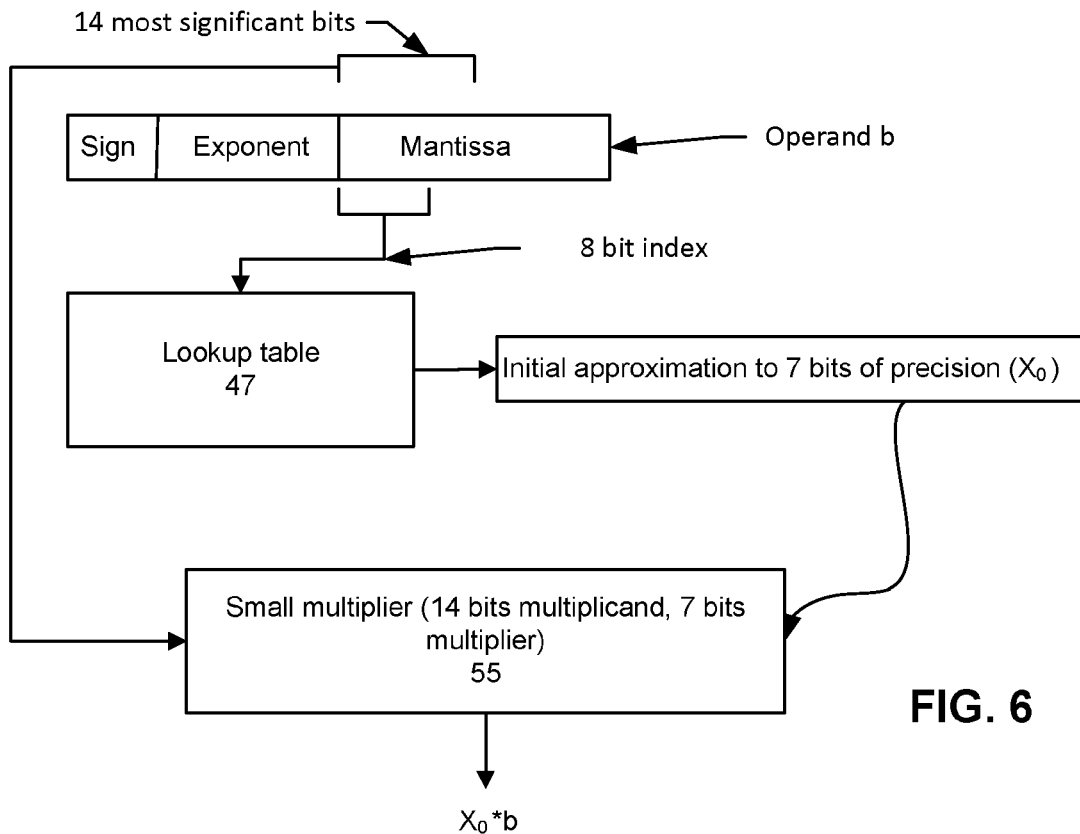
FIG. 6 and FIG. 7 depict different examples of using the small multiplier of FIG. 4.
Figure 7:
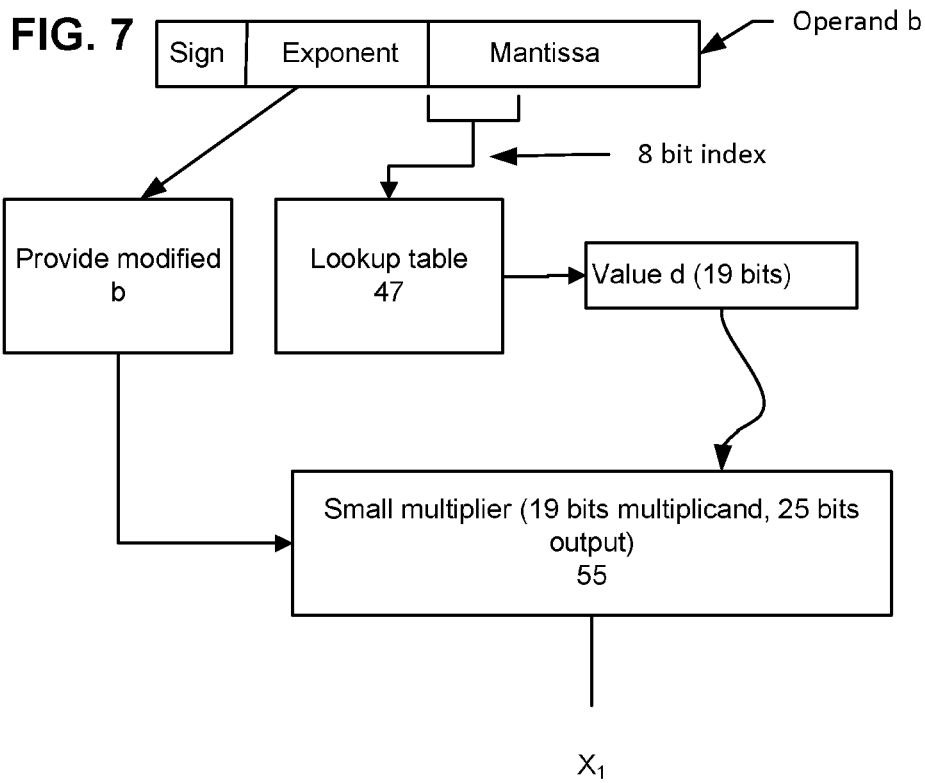

FIGS. 6 and 7 depict two example alternatives to implementing lookup table 47 and small multiplier 55 in accordance with FIGS. 5A and 5B, respectively. FIG. 6 depicts an implementation where 8. Most Significant Bits (MSBs) of operand b are used to index LUT 47, which outputs initial approximation $x_0$ with 7 bits of precision. Small multiplier 55 then performs the first multiplication of the first iteration. This multiplication is between the 7 bits outputted from LUT 47 and 14 MSBs from operand b).

FIG. 7 depicts an alternative where LUT 47 produces a value x' that is designed to be multiplied with a modified version of operand b (b̂). The multiplication between x' and b̂ results directly in $x_1$, without requiring multiplication 166, as is required to produce $x_1$ in the approach depicted in FIG. 5A. The implementation of FIG. 6 requires two additional iterations to obtain a single precision result, and three iterations to achieve a double precision result. The implementation of FIG. 7 requires one iteration for single precision and two for double precision. The modified version of b (b̂) can be formed as disclosed in Ito. The various entries in the LUT (each an x'), are formed to provide an appropriate output value after multiplication with b̂.

FIG. 8 depicts an example implementing a small multiplier 55 when implementing an approach according to FIG. 7. Initial approximation circuitry 125 outputs x' as explained above, and modifier circuitry 127 provides b̂. In FIG. 8, numbers in circles represent eighths of a unit of time required to traverse a particular portion of combinatorial logic, and numbers in squares represent a sum of those times within a particular clock cycle. FIG. 8 thus presents a more granular view of how one clock cycle is allocated among different combinatorial logic elements within each stage of multiplier 55. A fan out 130 distributes portions of each operand across a set of booth multiplexers 132. 3:2 compressors 134 provide an 8-wide output to 5:3 and 3:2 compressors 136, resulting in a 5-wide output to 5:3 compressors 138. Output from 5:3 compressors 138 is captured by flop 140, representing an end to one clock cycle. Flop 140 outputs to 3:2 compressors 142 that outputs to a CLA 144. Pick/save mux 146 can output a value to outputs to flop 148 and is operable to select CLA 144 output $x_1$, such as for starting a divide or square root operation, or other value, such as a value needed for some iteration by the full precision multiplier 25, as an input to mux 39 (see FIG. 4). Thus, multiplier 55 requires a total of two clock cycles to produce an output that can be returned to fan out 130.

Figure 9A:
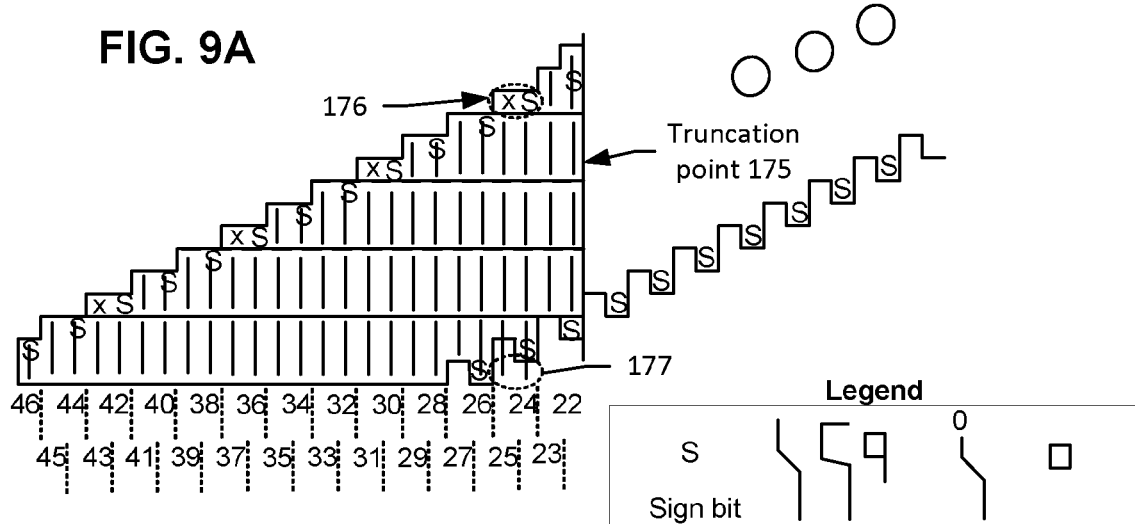
FIGS. 9A-9E depict diagrams showing inputs and outputs through the various combinatorial logic elements of FIG. 8.
Figure 9B:
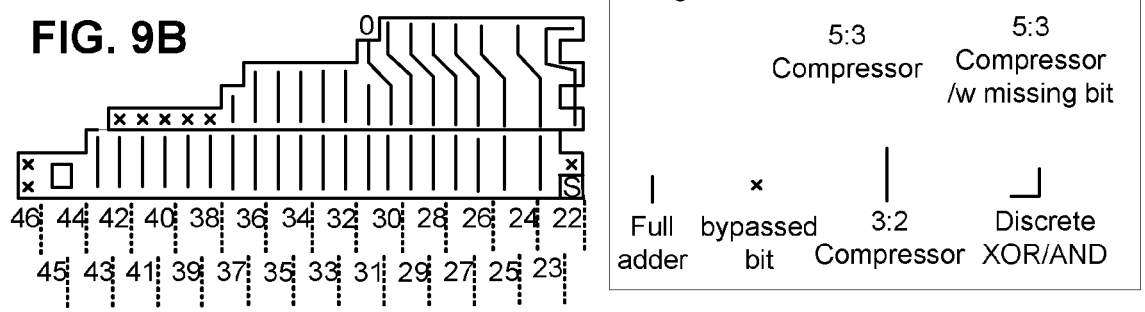
Figure 9C:
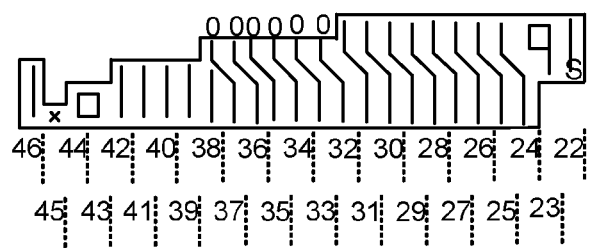
Figure 9D:
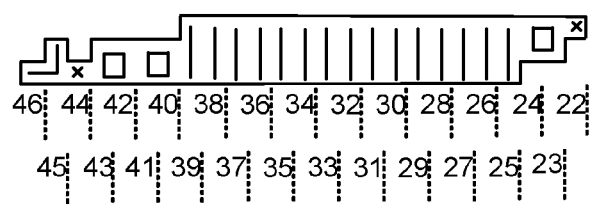
Figure 9E:
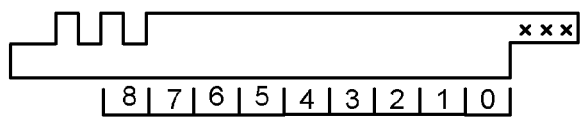

FIGS. 9A-9E show a progression through combinatorial logic elements of FIG. 8, and how outputs from one element are mapped to inputs of a following element. As explained above, small multiplier 55 does not implement a full precision (full width) multiplication, but rather a truncated multiplication. FIG. 9A depicts a booth encoding of inputs to 3:2 compressors 134 and that the multiplication is truncated as shown at truncation point 175. Each vertical line identifies a set of bits that will be presented as inputs to a particular 3:2 compressor in 3:2 compressors 134. The stair-step formation shows a bottom edge of some of the partial products that are not produced by multiplier 55, which would be produced by a full-precision multiplier. Dashed oval 176 identifies bits that are relocated to the dashed oval 177. Bit locations identified with the letter "S" show locations of sign bits or the negation of sign bits. FIG. 9B shows what bits are input to each 5:3 and 3:2 compressor in compressors 136. Bits marked with "X" bypass to the next FIG. 9, while in some cases, a 5:3 compressor may actually only input 4 bits, as explained in the legend associated with FIGS. 9A-9E. FIG. 9C depicts how bits are mapped to inputs of 5:3 compressors 138. FIG. 9D depicts how bits are mapped to inputs of 3:2 compressors 142. FIG. 9E depicts inputs to CLA 144, and each numbered pair of bits (0-8) identifies bits that are generate positions for the CLA.

FIGS. 9A-9E thus show that a large portion of the carry save adder structure that would be present in a full-precision multiplier is not present in an implementation of small multiplier 55. The absence of these structures allows small multiplier 55 to operate more quickly than full-precision multiplier 25.

Because least significant bits of partial products were not calculated, some error is present in the absence of potential carry-ins from those partial products. In other words, even though the output has 25 bits, not all of those bits can be considered accurate in this example, because carry-in bits that could have affected some portion of the low-order bits in the 25-bit result are absent. For example, if all of the partial products resulted in a carry, then the calculated lower-precision result could be lower by around twelve from what would have been calculated in a full-precision multiplier. Assuming that on average half of the partial products would result in a carry-in, the result would be expected to be too low by around 6. It is possible to inject a value to reduce this loss of precision. For example, a value 6 can be injected (binary 110) into the least precision bits of the last 3:2 compressor 142 (bits 24-22). However, the example of FIGS. 8 and 9 implement a multiplier that has extra precision for what is required to produce a single precision value in one iteration and a double precision value in two iterations. This is because an output of multiplier 55 has 25 bits, in this example, and at least 16 of these bits are accurate for $x_1$. Thus, after one iteration, the result will be accurate to 32 bits, which presents considerable margin for a single precision result, and is accurate to 64 bits with one more iteration, which more than satisfies double precision requirements.

As such, FIGS. 8 and 9 present an example of implementing the small multiplier to have as much precision as possible while also meeting the timing requirement that the small multiplier and the LUT operation complete within the same number of time increments as one multiply of the full-precision multiplier (the time increments are also considered in the context of a number of time increments that fit within one clock, where intermediate outputs are flopped and timing thus needs to be satisfied for those flops). It would be possible to design a small multiplier that has less margin of extra precision, and save some amount of area and power consumption, but it is not expected that such change would result in reduction in delay sufficient to alter an approach to making circuit timing. Yet, different implementations may present different opportunities, and there may be some implementations in which those savings are important, and other implementations in which those savings may allow a different relative timing setup. Those of ordinary skill would be able to adapt these disclosures to different opportunities and design criteria.

The above disclosure presented an example of a hierarchy of hardware elements that each perform the same operation but maintain different numbers of bits of precision in their respective outputs. The hierarchy of hardware elements are configured so that outputs of lower-precision elements provide inputs to higher precision elements. In some situations, elements within the hierarchy, or some portion thereof, also may selectively recycle an output either to itself, or to the input of another element. In order to calculate a final output value for a sequence of operations, progressively greater precision outputs are achieved by starting from low-precision inputs to the lowest precision hardware element, and allowing outputs of increasingly higher precision to propagate through the hierarchy, where propagation also includes multiple iterations through some subset of the hardware elements. Tying this back to the above examples, the hierarchy of the above-examples has two levels of multipliers, a lower-precision level and a full-precision level. The full-precision level can recycle outputs to inputs. Iterative refinement procedures are performed in the two levels by using the lower-precision level once, followed by one or more iterations through the full-precision level. However, other implementations may provide more levels of hierarchy, or provide different functions or combinations thereof within each level.

The above disclosure provided self-consistent examples of delays expected through different combinatorial logic elements and arrangement of such logic in a manner selected to cause the different stages of multiplier 55 to meet particular timing criteria, and that overall, the collection of stages meet the example design constraints. These examples do not imply that embodiments of the disclosure must be in accordance with these various details. Indeed, given the same constraints, multiple different solutions that meet those constraints can be found. Still further, different implementations may use different fabrication processes, different standard cell libraries, or other constraints that may cause different relative delays through different elements, and these differences may call for a different arrangement of pipeline stages or retiming of the pipelines of small multiplier 55 and full-precision multiplier 25. In these various situations, a person of ordinary skill would be able to adapt these disclosures for the specifics of those situations. Explicitly, a variety of different arrangements of combinatorial logic elements to form a carry save adder can satisfy a given set of design constraints and these examples are not limiting to how a small multiplier 55 according to the disclosure can be constructed.

Some aspects of the above-example focused on implementing a divide/square root unit, and specifically on producing a reciprocal (1/b for divide and 1/√b for square root). Although implementations of the disclosure provide benefits in these contexts, the disclosure also can be implemented in other contexts. More generally, implementations of the disclosure provide a reduced precision multiplier circuit that performs one or more multiplications for an operation that requires a series of two or more multiplications. Specific benefits result from implementing this reduced precision multiplier after a LUT operation, in order to complete both the LUT action and the reduced precision multiply within the same or less time as a full-precision multiply. More generally, aspects disclosed herein can be implemented in circumstances where pipelined processing occurs on a value generated in an operation that requires less time to complete than one cycle through the pipeline, and where required precision increases as processing proceeds. Also, while the pipeline examples assigned a clock cycle to the LUT that is separate from the low-precision first multiply, that is an example implementation, and the operation design point is to provide that the combined delay of the LUT and the first low-precision multiply complete within a timeframe required for a full-precision multiply to complete, for a particular implementation.

Modern general purpose processors regularly require in excess of two billion transistors to be implemented, while graphics processing units may have in excess of five billion transistors. Such transistor counts are likely to increase. Such processors have used these transistors to implement increasing complex operation reordering, prediction, more parallelism, larger memories (including more and bigger caches) and so on. As such, it becomes necessary to be able to describe or discuss technical subject matter concerning such processors, whether general purpose or application specific, at a level of detail appropriate to the technology being addressed. In general, a hierarchy of concepts is applied to allow those of ordinary skill to focus on details of the matter being addressed.

For example, high level features, such as what instructions a processor supports conveys architectural-level detail. When describing high-level technology, such as a programming model, such a level of abstraction is appropriate. Microarchitectural detail describes high level detail concerning an implementation of an architecture (even as the same microarchitecture may be able to execute different ISAs). Yet, microarchitectural detail typically describes different functional units and their interrelationship, such as how and when data moves among these different functional units. As such, referencing these units by their functionality is also an appropriate level of abstraction, rather than addressing implementations of these functional units, since each of these functional units may themselves comprise hundreds of thousands or millions of gates. When addressing some particular feature of these functional units, it may be appropriate to identify substituent functions of these units, and abstract those, while addressing in more detail the relevant part of that functional unit.

Functional modules may be composed of circuitry, where such circuitry may be fixed function, configurable under program control or under other configuration information, or some combination thereof. Functional modules themselves thus may be described by the functions that they perform, to helpfully abstract how some of the constituent portions of such functions may be implemented. In some situations, circuitry and functional modules may be described partially in functional terms, and partially in structural terms. In some situations, the structural portion of such a description may be described in terms of a configuration applied to circuitry or to functional modules, or both.

For example, describing a LookUp Table (LUT), a Carry Save Adder, a multiplexer and so on presents sufficient structural detail to a person of ordinary skill to understand a range of structures that satisfy such structural description.

Eventually, a precise logical arrangement of the gates and interconnect (a netlist) implementing these functional units (in the context of the entire processor) can be specified. However, how such logical arrangement is physically realized in a particular chip (how that logic and interconnect is laid out in a particular design) still may differ in different process technology and for a variety of other reasons. Many of the details concerning producing netlists for functional units as well as actual layout are determined using design automation, proceeding from a high level logical description of the logic to be implemented (e.g., a "hardware description language"). Therefore, those of ordinary skill in the art comprehend that describing functional characteristics of a circuit, group of circuits, or even an entire device also can sufficiently describe structure of such elements.

The term "circuitry" does not imply a single electrically connected set of circuits. Circuitry may be fixed function, configurable, or programmable. In general, circuitry implementing a functional unit is more likely to be configurable, or may be more configurable, than circuitry implementing a specific portion of a functional unit. For example, an Arithmetic Logic Unit (ALU) of a processor may reuse the same portion of circuitry differently when performing different arithmetic or logic operations. As such, that portion of circuitry is effectively circuitry or part of circuitry for each different operation, when configured to perform or otherwise interconnected to perform each different operation. Such configuration may come from or be based on instructions, or microcode, for example.

In all these cases, describing portions of a processor in terms of its functionality conveys structure to a person of ordinary skill in the art. In the context of this disclosure, the term "unit" refers, in some implementations, to a class or group of circuitry that implements the functions or functions attributed to that unit. Such circuitry may implement additional functions, and so identification of circuitry performing one function does not mean that the same circuitry, or a portion thereof, cannot also perform other functions. In some circumstances, the functional unit may be identified, and then functional description of circuitry that performs a certain feature differently, or implements a new feature may be described. However, such structure also may be produced by a temporary adaptation or configuration, such as one caused under program control, microcode, or other source of configuration.

Different approaches to design of circuitry exist, for example, circuitry may be synchronous or asynchronous with respect to a clock. Circuitry may be designed to be static or be dynamic. Different circuit design philosophies may be used to implement different functional units or parts thereof. Absent some context-specific basis to the contrary, "circuitry" encompasses all such design approaches.

Although circuitry or functional units described herein may be most frequently implemented by electrical circuitry, and more particularly, by circuitry that primarily relies on a transistor implemented in a semiconductor as a primary switch element, this term is to be understood in relation to the technology being disclosed. For example, different physical processes may be used in circuitry implementing aspects of the disclosure, such as optical, nanotubes, microelectrical mechanical elements, quantum switches or memory storage, magnetoresistive logic elements, and so on. Although a choice of technology used to construct circuitry or functional units according to the technology may change over time, this choice is an implementation decision to be made in accordance with the then-current state of technology.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described.

Implementations of the disclosure may be provided for use in embedded systems, such as televisions, appliances, vehicles, or personal computers, desktop computers, laptop computers, message processors, hand-held devices, multiprocessor systems, microprocessor-based or programmable consumer electronics, game consoles, network PCs, minicomputers, mainframe computers, mobile telephones, PDAs, tablets and the like.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases, terminology has been used herein because it is considered to more reasonably convey salient points to a person of ordinary skill, but such terminology should not be considered to impliedly limit a range of implementations encompassed by disclosed examples and other aspects. A number of examples have been illustrated and described in the preceding disclosure. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

What is claimed is:

1. A method of evaluating an output value of a function at an input value using an iterative refinement procedure requiring at least two multiplications for each iteration, comprising:
    producing an initial approximation of the output value based on the input value, the initial approximation having a first number of bits of precision, the first number of bits of precision being fewer than a required number of bits of precision in the output value;
    performing a first multiplication of a first iteration by a limited-precision multiplier comprising circuitry capable of maintaining, in an output, at least twice the first number of bits of precision and fewer bits of precision than required to produce a single-precision floating point mantissa, wherein the producing of the initial approximation and the performing of the first multiplication collectively require a first number of clock cycles;
    performing, in a full-precision multiplier, remaining multiplications for each iteration, each multiplication in the full-precision multiplier requiring at least the first number of clock cycles; and
    outputting said output value after performing said remaining multiplications.

2. The method of evaluating an output value of a function at an input value using an iterative refinement procedure requiring at least two multiplications for each iteration of claim 1, wherein the full-precision multiplier requires three clock cycles, the producing of the initial approximation of the output value requires one clock cycle and the performing of the first multiplication of the first iteration requires two clock cycles.

3. The method of evaluating an output value of a function at an input value using an iterative refinement procedure requiring at least two multiplications for each iteration of claim 1, wherein the output value is an approximation of a reciprocal of the input value and further comprising multiplying the output value with a dividend.

4. The method of evaluating an output value of a function at an input value using an iterative refinement procedure requiring at least two multiplications for each iteration of claim 1, wherein the output value is an approximation of a reciprocal of the square root of the input value and further comprising multiplying the output value with the input value.

5. The method of evaluating an output value of a function at an input value using an iterative refinement procedure requiring at least two multiplications for each iteration of claim 1, further comprising performing two iterations in producing a double-precision evaluation of the output value.

6. The method of evaluating an output value of a function at an input value using an iterative refinement procedure requiring at least two multiplications for each iteration of claim 1, further comprising using the limited-precision multiplier once and the full-precision multiplier twice in producing a single-precision evaluation of the output value.

\* \* \* \* \*